(12) United States Patent
Takasaki et al.

(10) Patent No.: US 11,454,760 B2
(45) Date of Patent: Sep. 27, 2022

(54) METHOD FOR MANUFACTURING OPTICAL FIBER AND OPTICAL FIBER

(71) Applicant: SUMITOMO ELECTRIC INDUSTRIES, LTD., Osaka (JP)

(72) Inventors: Suguru Takasaki, Osaka (JP); Hiroshi Kohda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/963,930

(22) PCT Filed: Jan. 24, 2019

(86) PCT No.: PCT/JP2019/002324
§ 371 (c)(1),
(2) Date: Jul. 22, 2020

(87) PCT Pub. No.: WO2019/146713
PCT Pub. Date: Aug. 1, 2019

(65) Prior Publication Data
US 2021/0041630 A1 Feb. 11, 2021

(30) Foreign Application Priority Data
Jan. 25, 2018 (JP) .............................. JP2018-010607

(51) Int. Cl.
*G02B 6/245* (2006.01)
*G02B 6/255* (2006.01)
*C03C 25/105* (2018.01)

(52) U.S. Cl.
CPC ........... *G02B 6/245* (2013.01); *G02B 6/2552* (2013.01); *G02B 6/2558* (2013.01); *C03C 25/105* (2013.01); *G02B 6/255* (2013.01)

(58) Field of Classification Search
None
See application file for complete search history.

(56) References Cited

U.S. PATENT DOCUMENTS

| | | | |
|---|---|---|---|
| 4,971,418 A | 11/1990 | Dorsey et al. | |
| 6,139,196 A * | 10/2000 | Feth | G02B 6/245 385/96 |
| 6,509,547 B1 * | 1/2003 | Bernstein | B08B 7/0042 219/121.68 |
| 6,550,985 B2 * | 4/2003 | Nakamura | G02B 6/2551 385/96 |

(Continued)

FOREIGN PATENT DOCUMENTS

| | | | |
|---|---|---|---|
| JP | H05-080226 A | 4/1993 | |
| JP | H10-068838 A | 3/1998 | |

(Continued)

*Primary Examiner* — Michelle R Connelly
(74) *Attorney, Agent, or Firm* — Faegre Drinker Biddle & Reath LLP (57) ABSTRACT

A method for manufacturing an optical fiber, the method including: a stripping step of partially stripping a coating layer of the optical fiber; a splicing step of fusion-splicing an exposed end surface of a glass fiber; and a recoating step of recoating a protective resin covering a stripped portion of the coating layer and an exposed portion of the glass fiber, in which the stripping step is a step of irradiating the coating layer with a laser light to strip the coating layer.

13 Claims, 5 Drawing Sheets

(56) References Cited

U.S. PATENT DOCUMENTS

| | | |
|---|---|---|
| 2002/0175151 A1 | 11/2002 | Ohta et al. |
| 2005/0201708 A1 | 9/2005 | Arishima et al. |
| 2013/0243948 A1* | 9/2013 | Baker ................ C03C 25/1065 427/162 |
| 2017/0031092 A1 | 2/2017 | Sohma et al. |

FOREIGN PATENT DOCUMENTS

| | | |
|---|---|---|
| JP | 2003-033893 A | 2/2003 |
| JP | 2003-043288 A | 2/2003 |
| JP | 2004-037762 A | 2/2004 |
| JP | 2010-250168 A | 11/2010 |
| JP | 2011-102915 A | 5/2011 |
| JP | 2015-219271 A | 12/2015 |
| KR | 20130080336 A | 7/2013 |
| WO | WO-03/079067 A1 | 9/2003 |

* cited by examiner

METHOD FOR MANUFACTURING OPTICAL FIBER AND OPTICAL FIBER

TECHNICAL FIELD

The present disclosure relates to a method for manufacturing an optical fiber and the optical fiber.

This application is based upon and claims the benefit of priority from Japanese Patent Application No. 2018-010607, filed Jan. 25, 2018, the entire contents of which are incorporated herein by reference.

BACKGROUND ART

As an optical fiber, for example, an optical fiber having a long length of several tens of kilometers such as a submarine cable is manufactured in response to a request from a user. The above-described optical fiber having the long length is usually formed by fusion-splicing a plurality of optical fibers. Here, it is required that peeling and cracking do not occur at an interface between a protective resin that protects a splicing portion and an original coating resin. For example, a technology disclosed in Patent Literatures 1 and 2 is known as a technology satisfying the above-described requirement.

CITATION LIST

Patent Literature

Patent Literature 1: JP-A-HOS-80226
Patent Literature 2: JP-A-2004-37762

SUMMARY OF INVENTION

A method for manufacturing an optical fiber according to the present disclosure includes: a step of partially stripping a coating layer of the optical fiber; a step of fusion-splicing an exposed end surface of a glass fiber; and a step of recoating a protective resin covering a stripped portion of the coating layer and an exposed portion of the glass fiber, in which the step of stripping is a step of irradiating the coating layer with a laser light to strip the coating layer.

An optical fiber according to the present disclosure is an optical fiber in which a coating layer at an end portion, on a splicing side, of each of a pair of optical fibers is stripped into a tapered shape, exposed end surfaces of glass fibers are fusion-spliced, and a periphery of exposed portions of the glass fibers is protected with a protective resin, in which the coating layer stripped into the tapered shape has unevenness extending on the circumference thereof.

An optical fiber according to the present disclosure is an optical fiber in which a coating layer at an end portion, on a splicing side, of each of a pair of optical fibers is stripped into a tapered shape, exposed end surfaces of glass fibers are fusion-spliced, and a periphery of exposed portions of the glass fibers is protected with a protective resin, in which the Young's modulus of a surface of the coating layer stripped into the tapered shape is greater than the Young's modulus of a portion of the coating layer located away from the surface and at a same radial direction position as the surface.

An optical fiber according to the present disclosure is an optical fiber in which a coating layer at an end portion, on a splicing side, of each of a pair of optical fibers is stripped into a tapered shape, exposed end surfaces of glass fibers are fusion-spliced, and a periphery of exposed portions of the glass fibers is protected with a protective resin, in which a shape of the tapered shape is a regular polygonal pyramid shape symmetrical with respect to an axis of the optical fiber.

TECHNICAL PROBLEM

As a factor of an increase in loss of an optical fiber, there is an influence of side pressure at the time of bobbin winding, and in order to reduce the loss, it is required to form a coating layer of the optical fiber with a two-layer structure, and to use a resin having a low Young's modulus (soft resin) in a primary layer on the center side. In a submarine cable using the optical fiber having such a coating layer of the two-layer structure, a crack may occur in a protective resin of a splicing portion.

Figure 7:
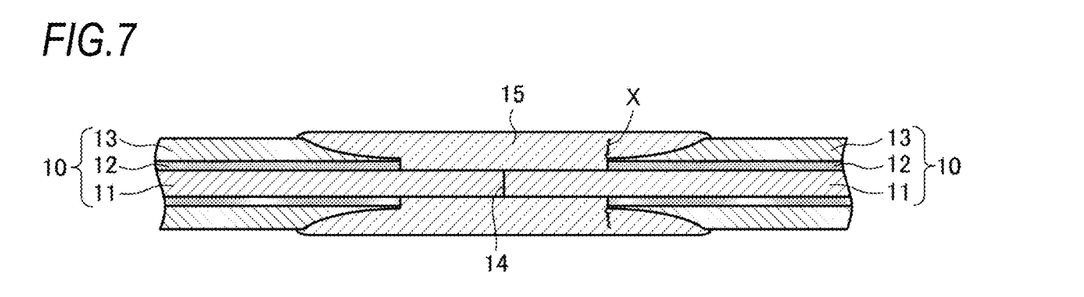
FIG. 7 is a diagram illustrating a configuration of a splicing portion of a related-art optical fiber including a coating layer of a two-layer structure.

FIG. 7 is a diagram illustrating a configuration of a splicing portion of a related-art optical fiber having a coating layer of a two-layer structure. The splicing portion is a portion where optical fibers 10, which are provided with a glass fiber 11 and the coating layer of the two-layer structure including a primary layer 12 on the center side around the glass fiber and a secondary layer 13 on the outer peripheral side, are spliced to each other. The coating layer is stripped at an end portion of each optical fiber 10, and the exposed glass fibers 11 are fusion-spliced at a fusion-splicing portion 14. FIG. 7 illustrates a case in which the coating layer is stripped in a tapered shape whose diameter is reduced toward the side of the fusion-splicing portion 14, but only the secondary layer 13 is stripped in the tapered shape, and the primary layer 12 is not stripped in the tapered shape. A protective resin 15 is molded and recoated so as to cover the fusion-splicing portion 14 and the entire stripped portion of the coating layer.

As described above, in the splicing portion of the related-art optical fiber, the coating of the end portions of the short fibers is stripped and the fusion-splicing is performed, and the splicing portion is recoated with the protective resin 15. Here, when the Young's modulus of the primary layer 12 of the optical fiber 10 is low, a deformation amount of the primary layer 12 at a coating stripping end becomes large when screening (an intensity test) is performed. Therefore, stress becomes maximum at a contact point between a boundary of the primary layer 12 and the secondary layer 13 and the protective resin 15, such that distortion may occur in the protective resin 15 and thus a crack X may occur.

Figure 8:
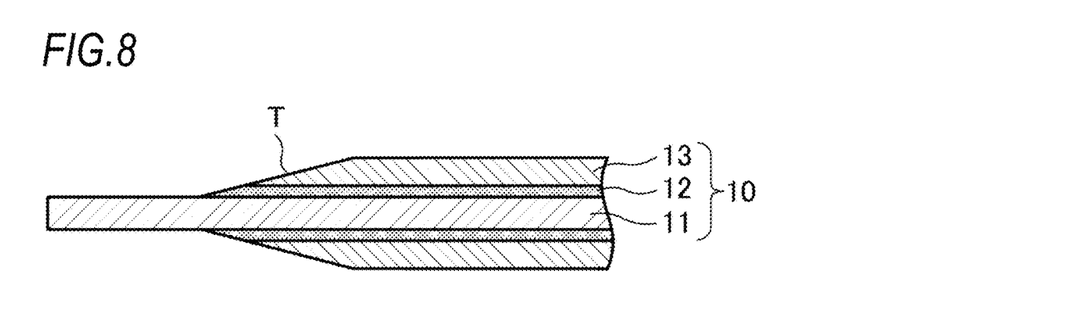
FIG. 8 is a diagram illustrating an example of an optical fiber in which a coating layer stripping end of a splicing end is formed in a tapered shape.

As a countermeasure for preventing the occurrence of the crack X in the protective resin, in order to disperse the stress at the contact point between the boundary of the primary layer 12 and the secondary layer 13 and the protective resin 15, for example, as illustrated in FIG. 8, it is desirable that a coating layer stripping end of a splicing end of the primary layer 12 and the secondary layer 13 is formed to become a tapered shape T. That is, it is desirable that the boundary of the primary layer 12 and the secondary layer 13 after the coating layer is stripped is formed as the tapered shape T having a predetermined angle.

However, a skill is required to cut a coating layer of a thin optical fiber with a razor to form the tapered shape as illustrated in FIG. 8. Particularly, when the primary layer 12 is a soft resin, it is difficult to cut the primary layer 12 well. When the coating layer is stripped with a rotary tool such as a router, the soft primary layer 12 adheres to a grindstone, and thus it is difficult to strip the coating layer in a desired shape. Accordingly, when the coating layer is stripped by using the related-art tool, a variation in shape occurs even due to a skill difference, thereby causing a problem that the quality of manufactured cables is not constant. Also, there is a possibility that the tool may damage the glass fiber.

The present disclosure has been made in consideration of the above-described circumstances, and an object thereof is to provide a method for manufacturing an optical fiber and the optical fiber in which occurrence of a crack in a protective resin covering a stripped portion of a coating layer and an exposed portion of a glass fiber is prevented, and quality is stable without damaging the glass fiber.

Advantageous Effects of the Present Disclosure

According to the present disclosure, it is possible to obtain an optical fiber capable of preventing occurrence of a crack in a protective resin covering a stripped portion of a coating layer and an exposed portion of a glass fiber, and having stable quality without damaging the glass fiber.

DESCRIPTION OF EMBODIMENTS OF THE PRESENT DISCLOSURE

First, an embodiment of the present disclosure will be listed and described.

(1) A method for manufacturing an optical fiber according to an embodiment of the present disclosure includes: a step of partially stripping a coating layer of the optical fiber; a step of fusion-splicing an exposed end surface of a glass fiber; and a step of recoating a protective resin covering a stripped portion of the coating layer and an exposed portion of the glass fiber, in which the step of stripping is a step of irradiating the coating layer with a laser light to strip the coating layer.

According to the embodiment, since the coating layer of the optical fiber is stripped by laser processing, in a non-contact manner, the glass fiber is not damaged, and variation in processing can be reduced.

(2) In the method for manufacturing the optical fiber according to the embodiment of the present disclosure, in the method for manufacturing according to (1), a wavelength of the laser light is 170 nm or more and 250 nm or less.

According to the embodiment, the coating layer can be stripped in a good shape without being deformed.

(3) In the method for manufacturing the optical fiber according to the embodiment of the present disclosure, in the method for manufacturing according to (1) or (2), an energy density of the laser light is 1000 mJ/cm$^2$ or less.

According to the embodiment, even when the glass fiber is irradiated with the laser light, an optical damage to the glass fiber can be reduced.

(4) In the method for manufacturing the optical fiber according to the embodiment of the present disclosure, in the method for manufacturing according to any one of (1) to (3), the step of stripping is a step of processing an end portion of the coating layer into a tapered shape whose diameter is reduced toward the exposed portion of the glass fiber.

According to the embodiment, an overlapping portion between the stripped coating layer and a protective coating can be increased. When the coating layer has a two-layer structure, it is possible to prevent stress from concentrating on a boundary between a primary layer on the center side and a secondary layer on the outer peripheral side.

(5) In the method for manufacturing the optical fiber according to the embodiment of the present disclosure, in the method for manufacturing according to (4), the step of stripping is a step of repeating: a step of arranging a mask that allows the laser light to pass through only a predetermined region between the optical fiber and a light source of the laser light and scanning the mask in a direction perpendicular to an axial direction of the optical fiber and in a direction perpendicular to an irradiation direction of the laser light; and a step of rotating the optical fiber about an axis of the optical fiber to change an irradiation position of the laser light to the optical fiber.

According to the embodiment, it is possible to provide a specific method for stripping the coating layer of the optical fiber into the tapered shape.

(6) In the method for manufacturing the optical fiber according to the embodiment of the present disclosure, in the method for manufacturing according to (4), the step of stripping is a step of rotating the optical fiber about an axis of the optical fiber and irradiating only the coating layer portion with the laser light while avoiding the glass fiber of the optical fiber.

According to the embodiment, it is possible to provide a specific method for stripping the coating layer of the optical fiber into the tapered shape while preventing the glass fiber from being irradiated with the laser light.

(7) In the method for manufacturing of the optical fiber according to the embodiment of the present disclosure, in the method for manufacturing according to (4), the step of stripping is a step of rotating the optical fiber about an axis of the optical fiber and irradiating the optical fiber with the laser light in a state where a mask that allows the laser light to pass through only a predetermined region is arranged between the optical fiber and a light source of the laser light.

According to the embodiment, it is possible to provide a specific method for stripping the coating layer of the optical fiber into the tapered shape.

(8) In the method for manufacturing the optical fiber according to the embodiment of the present disclosure, in the method for manufacturing according to any one of (1) to (7), the coating layer of the optical fiber has a two-layer structure including a primary layer on a center side and a secondary layer on an outer periphery side, and the Young's modulus of the primary layer is 0.5 MPa or less.

According to the embodiment, even when the primary layer is a soft optical fiber, the coating layer can be stripped and spliced in a good shape, thereby making it possible to reduce the loss at the time of bobbin winding.

(9) In the method for manufacturing of the optical fiber according to the embodiment of the present disclosure, the method for manufacturing according to any one of (1) to (8) further includes: a step of exposing the glass fiber by extracting the coating layer of the optical fiber on one side from a portion where the coating layer is partially stripped, after the step of stripping.

According to the embodiment, since it is not required to form the exposed portion of the glass fiber on one end side of the optical fiber in advance, the step can be simplified. It is possible to prevent the exposed portion of the glass fiber from being irradiated with the laser light.

(10) An optical fiber according to an embodiment of the present disclosure is an optical fiber in which a coating layer at an end portion, on a splicing side, of each of a pair of optical fibers is processed into a tapered shape, exposed end surfaces of glass fibers are fusion-spliced, and a periphery of exposed portions of the glass fiber is protected with a protective resin, in which the coating layer processed into the tapered shape has unevenness extending on the circumference thereof.

According to the embodiment, since an adhesion area between the coating layer stripped in the tapered shape and the protective resin increases, it is possible to increase the intensity of the fusion-spliced optical fiber. With respect to the unevenness extending on the circumference, an uneven shape can be easily realized by adjusting a distribution of laser intensity to be emitted in a longitudinal direction of the fiber by a mask, without making it constant. It is difficult to realize the uneven shape with a related-art razor and a grindstone.

(11) An optical fiber according to an embodiment of the present disclosure is an optical fiber in which a coating layer at an end portion, on a splicing side, of each of a pair of optical fibers is processed into a tapered shape, exposed end surfaces of glass fibers are fusion-spliced, and a periphery of exposed portions of the glass fibers is protected with a protective resin, in which the Young's modulus of a surface of the coating layer processed into the tapered shape is greater than the Young's modulus of a portion of the coating layer located away from the surface an at a same radial direction position as the surface.

According to the embodiment, the Young's modulus of the tapered surface portion is set to be greater than the Young's modulus of the inside of the coating layer of the optical fiber, thereby making it possible to relieve stress concentration at an adhesion portion with the protective resin and to prevent a crack from occurring in the protective resin. Particularly, when the coating layer has a two-layer structure and a primary coating is formed of a material having a small Young's modulus, there is a large difference in the Young's modulus of a coating resin in the tapered surface portion, such that the Young's modulus of the tapered surface portion is set to be large, thereby having a great effect of suppressing the occurrence of the crack. With respect to setting the Young's modulus of the tapered surface portion to be greater than the Young's modulus of the inside of the coating layer of the optical fiber, by performing a taper process with laser irradiation, the tapered surface portion is post-cured such that curing of the resin proceeds as compared to before the irradiation, whereby it is easy to realize setting the Young's modulus of the tapered surface to be great.

(12) An optical fiber according to an embodiment of the present disclosure is an optical fiber in which a coating layer at an end portion, on a splicing side, of each of a pair of optical fibers is processed into a tapered shape, exposed end surfaces of glass fibers are fusion-spliced, and a periphery of exposed portions of the glass fibers is protected with a protective resin, in which the tapered shape is a regular polygonal pyramid shape symmetrical with respect to an axis of the optical fiber.

According to the embodiment, by forming the tapered shape into the regular polygonal pyramid shape, it is possible to increase the intensity against a force in a twisting direction of the optical fiber. The regular polygonal pyramid shape can be obtained by striping the coating layer of the optical fiber by laser irradiation. In a related-art razor process, since an asymmetrical polygonal pyramid is formed, distortion caused by the twisting may be concentrated on a specific portion and thus the intensity may deteriorate. In a grindstone process, a polygonal pyramid shape cannot be realized.

DETAILS OF EMBODIMENTS OF THE PRESENT DISCLOSURE

Hereinafter, a specific example of a method for manufacturing of an optical fiber and the optical fiber according to the present disclosure will be described with reference to the drawings. The present invention is not limited to the following examples but is indicated by the scope of the claims, and is intended to include all the modifications within meanings equivalent to the scope of the claims and within the scope. The present invention includes a combination of any embodiments as long as a plurality of embodiments can be combined with each other. In the following description, configurations denoted by the same reference signs are regarded as the same configurations even in different drawings, and the description thereof may be omitted.

Figure 1:
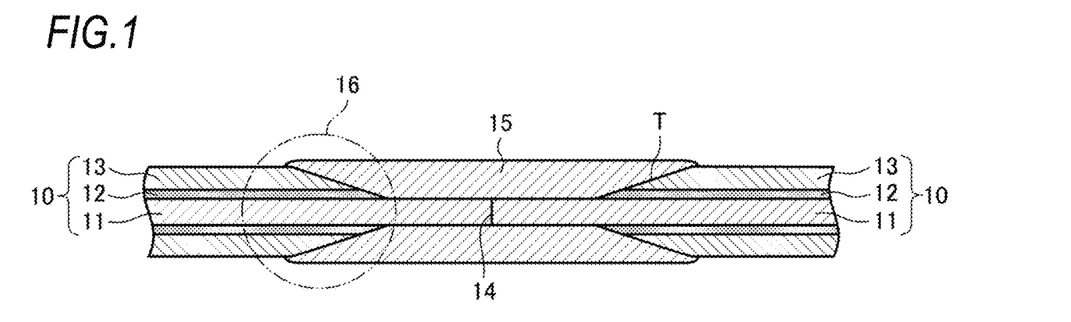
FIG. 1 is a diagram illustrating a configuration of a splicing portion of an optical fiber manufactured according to the present disclosure.

FIG. 1 is a diagram illustrating a configuration of a splicing portion of an optical fiber to be manufactured according to the present disclosure. The optical fiber to be manufactured according to the present disclosure is formed by fusion-splicing a plurality of short optical fibers 10. In the fusion-splicing of the optical fibers, glass fibers 11 are exposed by stripping coating layers of the optical fibers 10 at end portions of a pair of optical fibers 10 spliced to each other. End surfaces of the glass fibers 11 which are naked by stripping the coating layer are abutted against each other, and the abutted end surfaces are spliced to each other as a fusion-splicing portion 14 by arc discharge.

Since the fusion-splicing portion 14 and the naked glass fiber 11 in the vicinity thereof are easily damaged and mechanically in a weak state, the fusion-splicing portion 14 and the naked glass fiber 11 are recoated with a protective resin 15. As the protective resin 15, an ultraviolet curable resin which is the same type as that of the coating layer is used. The coating of the protective resin 15 can be formed by injecting a resin by using a predetermined molding die.

In the embodiment, the coating layer of the optical fiber 10 has a double structure including a primary layer 12 on the center side and a secondary layer 13 on the outer peripheral side. In order to cause the primary layer 12 on the center side to be less likely to be affected by the side pressure at the time of bobbin winding or cabling which causes a loss increase of the optical fiber 10, a resin having a low Young's modulus of 0.5 MPa or less is used for the primary layer 12, and a resin having a higher Young's modulus than that of the primary layer 12 is used for the secondary layer 13 on the outer peripheral side. The magnitude of the Young's modulus of the protective resin 15 is greater than that of the resin of the primary layer 12, and is smaller than that of the resin of the secondary layer 13.

In the embodiment, when coating the coating layer at the end portion of the optical fiber 10, a coating diameter is formed into a tapered shape T smaller toward the end portion side. The protective resin 15 is molded to cover the portion of the tapered coating layer. According to the configuration, an end surface of the coating edge of the coating layer is covered and is not exposed. Since the coating edge of the coating layer has the tapered shape T, an overlapping portion 16 covered with the protective resin 15 of the coating edge can be thickened, and an adhesive area at this portion is increased, thereby making it possible to improve an adhesive force with the protective resin 15. It is possible to disperse stress at a contact point between a boundary of the primary layer 12 and the secondary layer 13 and the protective resin 15.

The method for manufacturing the optical fiber illustrated in FIG. 1 includes a stripping step of partially stripping the coating layers of the two optical fibers 10 so that each of their coating edges forms the tapered shape; a splicing step of fusion-splicing exposed end surfaces of the glass fibers 11; and a recoating step of recoating the protective resin 15 that covers a stripped portion of the coating layer and an exposed portion of the glass fiber 11. Hereinafter, the stripping step of the coating layer of the optical fiber will be described.

First Example of Stripping Step

Figure 2A:
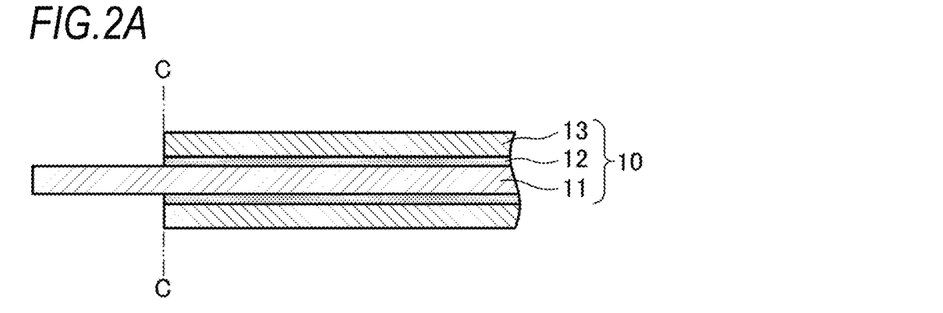
FIG. 2A is a diagram illustrating a first example of a step of stripping a coating layer of the optical fiber.
Figure 2B:
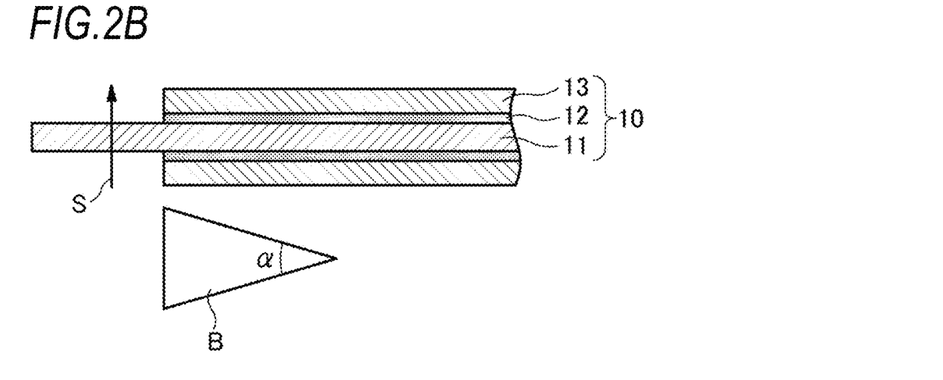
FIG. 2B is a diagram illustrating the first example of the step of stripping the coating layer of the optical fiber.
Figure 2C:
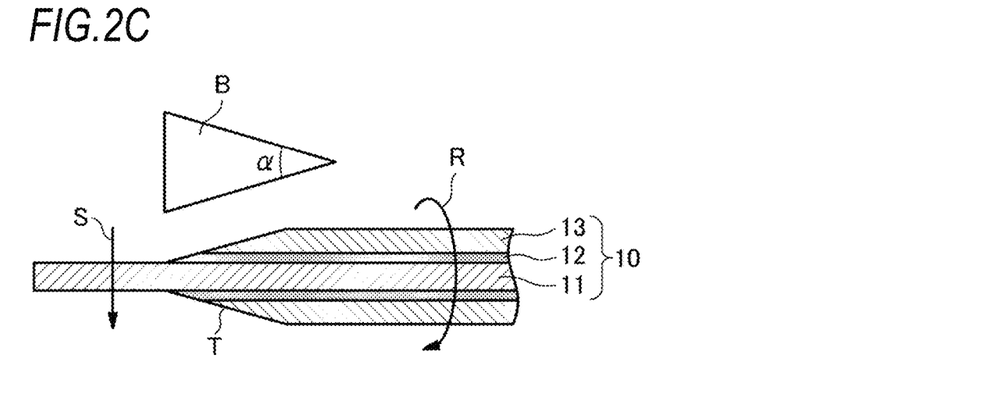
FIG. 2C is a diagram illustrating the first example of the step of stripping the coating layer of the optical fiber.

FIGS. 2A to 2C are diagrams illustrating an example of the stripping step of the coating layer of the optical fiber. First, as illustrated in FIG. 2A, the coating layer at the end portion of the optical fiber 10 is cut at a location of C-C, and the coating layer on the end portion side is pulled out and stripped, such that the glass fiber 11 on the end side is exposed. The exposed glass fiber 11 is cut so that a distance from the coating layer becomes a predetermined length to form an end surface for fusion-splicing. The end surface for fusion-splicing may be formed after forming a tapered surface of the coating layer which will be described later.

Next, as illustrated in FIG. 2B, the coating layer of the optical fiber 10 is irradiated with a triangular laser light B, and the end portion of the coating layer is processed to become a tapered shape. Specifically, the triangular laser light B having an apex angle α of approximately 30° and a height of approximately 500 μm is scanned in a radial direction from an upper surface side of the optical fiber 10. Here, as the laser light, it is desirable to use a laser having an energy density of 1000 mJ/cm$^2$ or less and a wavelength of 250 nm or less. When the energy density of the laser light exceeds 1000 mJ/cm$^2$, the glass may be damaged and thus an optical characteristic and intensity may be affected when the glass is irradiated with the laser light. When the glass fiber is irradiated with an ultraviolet light whose laser light wavelength is shorter than 170 nm, the ultraviolet light is absorbed by the glass and defectiveness occurs, which affects the optical characteristic and the intensity, such that it is desirable to use laser light whose wavelength is equal to or more than 170 nm. A triangular shape can be obtained by arranging a mask including a triangular opening between a light source of the laser light and the optical fiber. A diameter of the optical fiber 10 is approximately 250 μm.

As illustrated in FIG. 2B, as a laser light scanning step, a base of the triangular laser light is caused to almost coincide with the end portion of the coating layer of the optical fiber 10, and in a state where an apex is positioned on the side opposite to the end surface of the optical fiber, the coating layer is sublimated by scanning the laser light from the upper surface side of the optical fiber 10 in a radial direction indicated by an arrow S a predetermined number of times. Since a laser light irradiation surface of the optical fiber 10 has a large irradiation amount of the laser light at the base portion of the triangular shape, a resin amount to be stripped by sublimation is large, and since the laser light irradiation surface thereof has a small irradiation amount of the laser light at the apex portion thereof, the resin amount to be stripped by sublimation is small. Accordingly, the coating layer on the upper surface side of the optical fiber 10 is stripped in an almost tapered shape.

Next, as illustrated in FIG. 2C, as a position changing step, the optical fiber 10 is rotated by a predetermined angle as indicated by an arrow R, thereby changing a position of the laser light irradiation surface of the optical fiber 10. Next, the triangular laser light B is scanned again from the upper surface side of the optical fiber 10, thereby stripping the coating layer on the upper surface side of the optical fiber 10 in a tapered shape. The laser light scanning step and the position changing step are repeatedly performed a predetermined number of times, whereby the end portion of the coating layer of the optical fiber 10 can be stripped so as to have a polygonal pyramid shape. Next, the rotation angle of the optical fiber 10, the energy density of the laser light, and the number of scans are adjusted, whereby the end portion of the coating layer can be formed in a regular polygonal pyramid shape symmetrical with respect to an axis of the optical fiber.

As a specific laser light, it is possible to use a short wavelength excimer laser using a mixed gas of KrF having a wavelength of 248 nm or ArF having a wavelength of 193 nm with the energy density of 1000 mJ/cm$^2$ or less. When a laser light having a long wavelength is used, the resin of the coating layer melts or burns, such that the coating layer cannot be stripped in a good shape. When a laser light greater than 1000 mJ/cm$^2$ is used, an optical damage of the glass fiber becomes large when the glass fiber is irradiated with the laser light. A tapered surface portion is post-cured by performing a taper process with laser irradiation, such that curing of the resin proceeds as compared to before the irradiation, and the Young's modulus of the surface of the coating layer processed into the tapered shape becomes greater than the Young's modulus of a portion of the coating layer located away from the surface and at the same radial direction position as the surface.

Second Example of Stripping Step

Figure 3A:
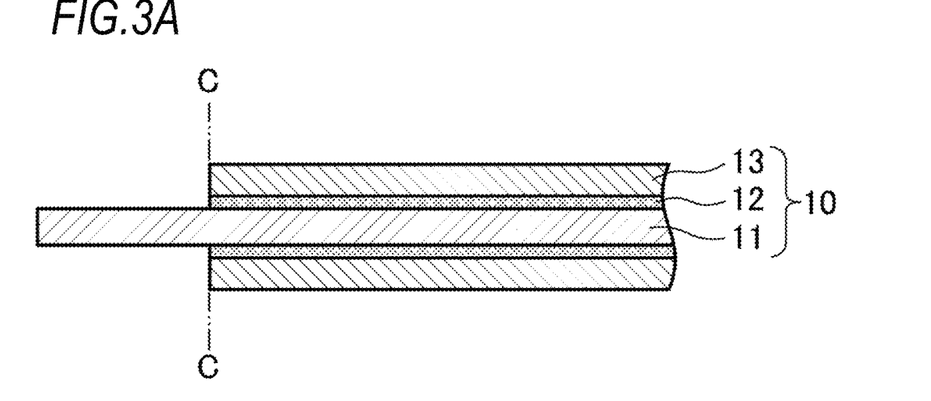
FIG. 3A is a diagram illustrating a second example of the step of stripping the coating layer of the optical fiber.

FIGS. 3A to 3C are diagrams illustrating another example of the stripping step of the coating layer of the optical fiber. In the embodiment, as illustrated in FIG. 3A, the coating layer at the end portion of the optical fiber 10 is cut at the location of C-C, and the coating layer on the end portion side is pulled out and stripped, such that the glass fiber 11 on the end portion side is exposed. This is the same as the point illustrated in FIG. 2A.

Figure 3B:
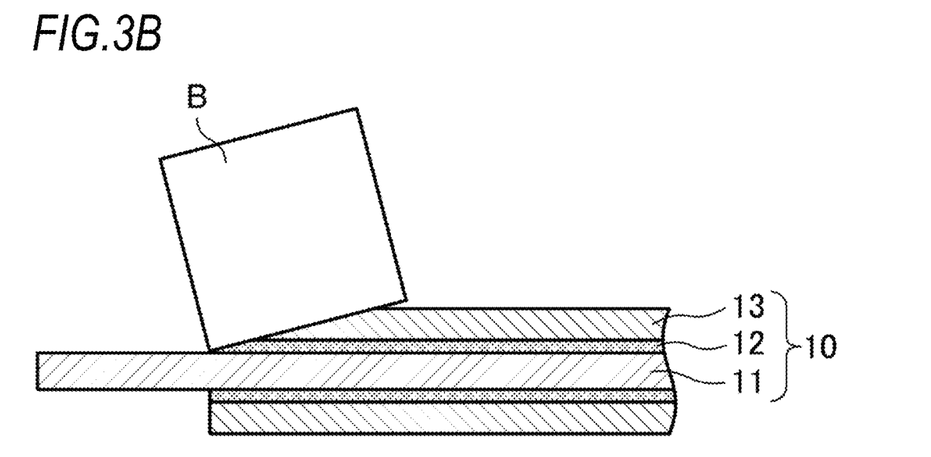
FIG. 3B is a diagram illustrating the second example of the step of stripping the coating layer of the optical fiber.
Figure 3C:
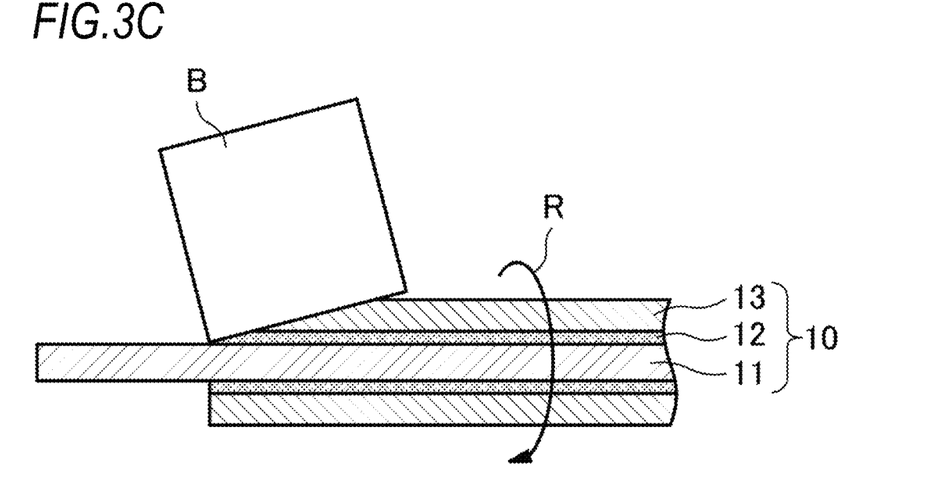
FIG. 3C is a diagram illustrating the second example of the step of stripping the coating layer of the optical fiber.

Next, as illustrated in FIG. 3B, for example, when viewed from the upper surface side, the rectangular laser light B or the triangular laser light and the optical fiber 10 are positioned while avoiding fiber glass so that the laser light B is obliquely applied to only the coating layer at the end portion of the optical fiber 10. Next, as illustrated in FIG. 3C, the laser light B is emitted while rotating the optical fiber 10. As a result, the resin of the coating layer of the portion irradiated with the laser light B is stripped by sublimation, and a shape of the end portion of the coating layer becomes a conical tapered shape. Here, with respect to the type and energy density of the laser light, it is possible to use the same laser light as that of the first example of the stripping step described with reference to FIGS. 2B and 2C.

Third Example of Stripping Step

Figure 4A:
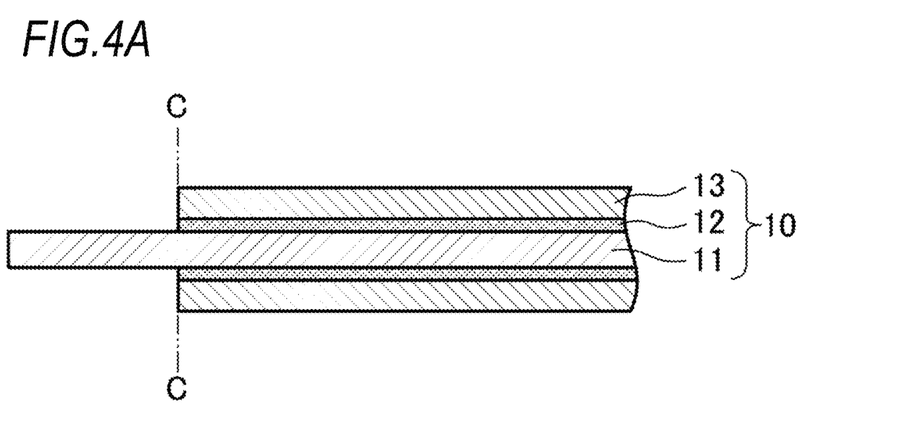
FIG. 4A is a diagram illustrating a third example of the step of stripping the coating layer of the optical fiber.

FIGS. 4A to 4C are diagrams illustrating still another example of the stripping step of the coating layer of the optical fiber. In the embodiment, as illustrated in FIG. 4A, the coating layer at the end portion of the optical fiber 10 is cut at the location of C-C, and the coating layer on the end portion side is pulled out and stripped, such that the glass fiber 11 on the end portion side is exposed. This is the same as the point illustrated in FIG. 2A.

Figure 4B:
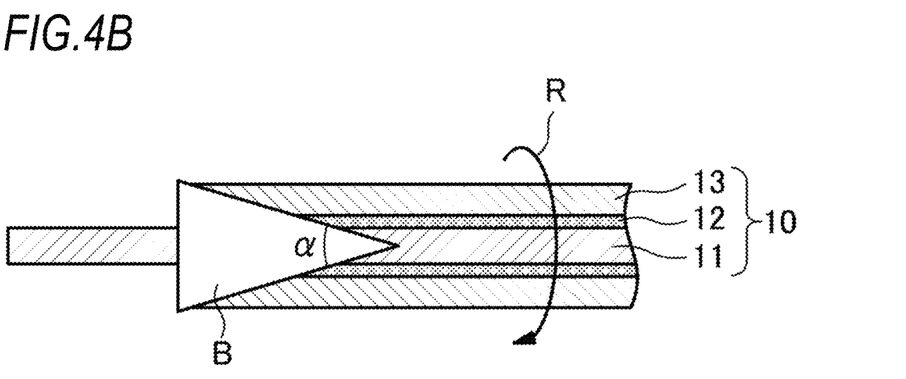
FIG. 4B is a diagram illustrating the third example of the step of stripping the coating layer of the optical fiber.
Figure 4C:
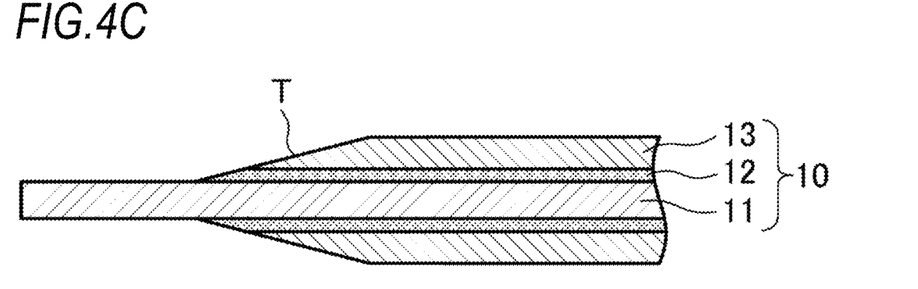
FIG. 4C is a diagram illustrating the third example of the step of stripping the coating layer of the optical fiber.

Next, as illustrated in FIG. 4B, while the optical fiber 10 is rotated, a base of the triangular laser light B is caused to almost coincide with the end portion of the coating layer of the optical fiber 10, and the laser light B is emitted from the upper surface side in a state where an apex is positioned on the side opposite to the end surface of the optical fiber. A shape, a type, and an energy density of the laser light are the same as those of the laser light B in the first example of the stripping step illustrated in FIGS. 2B and 2C. Since a laser light irradiation surface of the optical fiber 10 has a large irradiation amount of the laser light at the base portion of the triangular shape, a resin amount to be stripped by sublimation is large, and since the laser light irradiation surface thereof has a small irradiation amount of the laser light at the apex portion, the resin amount to be stripped by sublimation is small. Since the laser light B is emitted while the optical fiber 10 is rotated, the end portion of the coating layer of the optical fiber 10 is stripped in an almost conical tapered shape as illustrated in FIG. 4C.

Fourth Example of Stripping Step

Figure 5A:
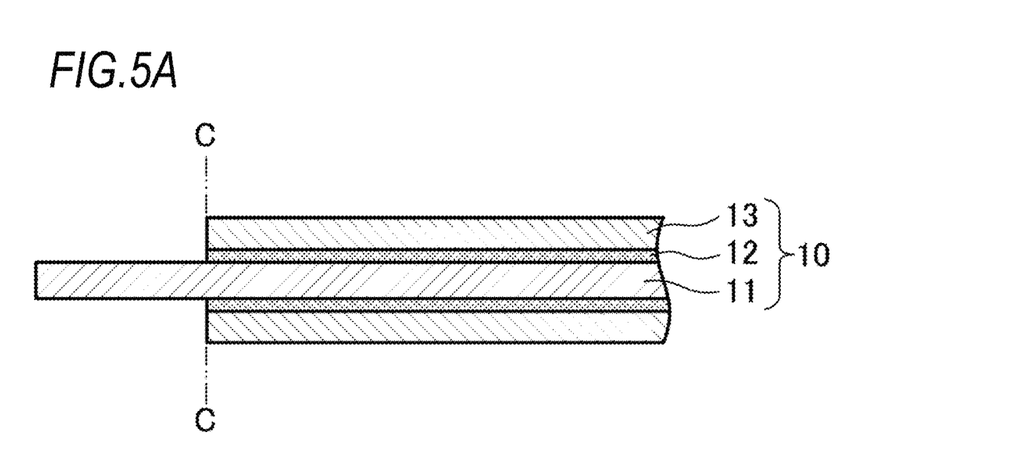
FIG. 5A is a diagram illustrating a fourth example of the step of stripping the coating layer of the optical fiber.

FIGS. 5A to 5C are diagrams illustrating still another example of the stripping step of the coating layer of the optical fiber. In the embodiment, as illustrated in FIG. 5A, the coating layer at the end portion of the optical fiber 10 is cut at the location of C-C, and the coating layer on the end portion side is pulled out and stripped, such that the glass fiber 11 on the end portion side is exposed. This is the same as the point illustrated in FIG. 2A.

Figure 5B:
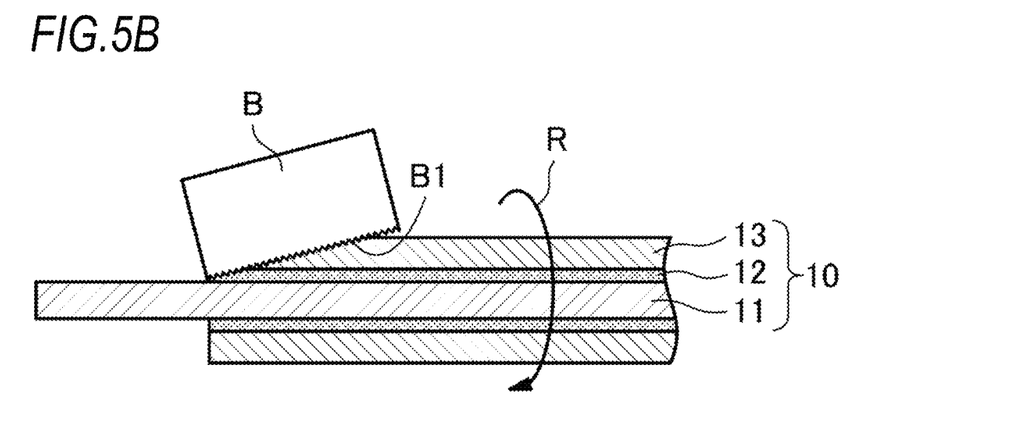
FIG. 5B is a diagram illustrating the fourth example of the step of stripping the coating layer of the optical fiber.
Figure 5C:
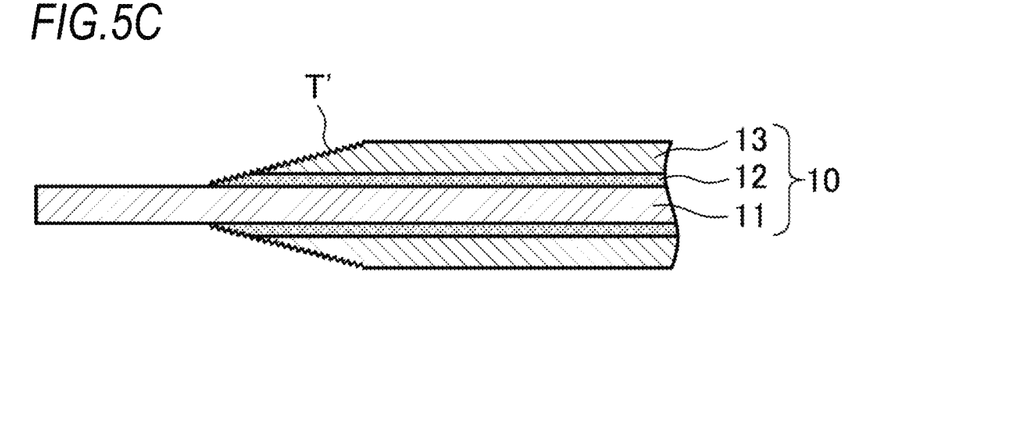
FIG. 5C is a diagram illustrating the fourth example of the step of stripping the coating layer of the optical fiber.

The embodiment is similar to the second example of the stripping step illustrated in FIGS. 3A to 3C, and for example, when viewed from the upper surface side, the optical fiber 10 is irradiated with the rectangular laser light B while avoiding fiber glass so that the laser light B is obliquely applied to only the coating layer at the end portion of the optical fiber 10. That is, a mask shape of the laser light is set so that a shape of the laser light B at a portion abutting on the coating layer of the optical fiber 10 becomes an uneven shape B1 as illustrated in FIG. 5B. Accordingly, due to the rotation of the optical fiber 10, as illustrated in FIG. 5C, the coating layer processed into a tapered shape T' at the end portion of the optical fiber 10 is formed with unevenness extending on the circumference thereof. Therefore, when the protective resin is recoated after the glass fiber 11 is fusion-spliced, an adhesion area between the coating layer and the protective resin is increased, thereby making it possible to increase the intensity of the fusion-spliced optical fiber.

Fifth Example of Stripping Step

Figure 6:
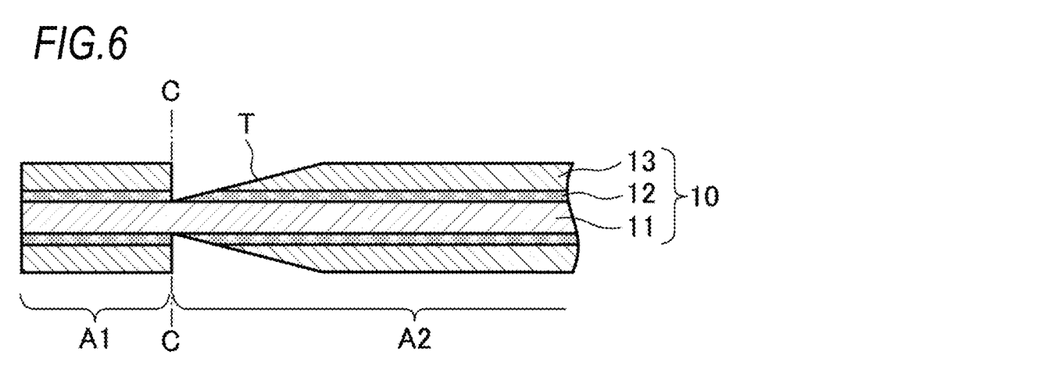
FIG. 6 is a diagram illustrating a fifth example of the step of stripping the coating layer of the optical fiber.

FIG. 6 is a diagram illustrating still another example of the stripping step of the coating layer of the optical fiber. In the embodiment, it is not required to perform the step of causing the glass fiber 11 on the end portion side to be exposed by cutting the coating layer at the end portion of the optical fiber 10 at the location of C-C and by pulling out and stripping the coating layer at the end portion side as shown in the first to fourth examples of the stripping step. In the embodiment, the coating layer in the vicinity of the end portion of the optical fiber 10 which is entirely covered with the coating layer is partially stripped by the method according to any one of the first to fourth examples of the stripping step. Accordingly, the coating layer at the location of C-C illustrated in FIG. 6 is stripped, and the glass fiber 11 becomes in a state of being exposed at this location. The tapered shape T is formed in the coating layer at a portion A2 on the opposite end portion side from the location of C-C of the optical fiber 10.

Next, the coating layer at a portion A1 remaining on the end portion side of the optical fiber 10 is pulled out from the portion A2 on the opposite end portion side, thereby making it possible to obtain the exposed portion of the glass fiber 11 to be fusion-spliced. As such, since it is not required to form the exposed portion of the glass fiber on one end side of the optical fiber in advance, the step can be simplified. In the stripping step of the coating layer, since there is no exposed portion of the glass fiber 11 other than the portion of the coating layer to be stripped, the optical fiber 10 can be easily handled, and the glass fiber 11 can be prevented from being irradiated with the laser light.

While the embodiments of the present disclosure have been described above, in the method for manufacturing the optical fiber according to the present disclosure, the resin layer of the optical fiber 10 is not limited to the one having a two-layer structure, and a resin layer including one layer or three or more layers is also applicable.

REFERENCE SIGNS LIST

10: optical fiber
11: glass fiber
12: primary layer
13: secondary layer
14: fusion-splicing portion
15: protective resin
16: overlapping portion

The invention claimed is:
1. A method for manufacturing an optical fiber, the method comprising:
a step of partially stripping a coating layer of the optical fiber;
a step of fusion-splicing an exposed end surface of a glass fiber; and a step of recoating a protective resin covering a stripped portion of the coating layer and an exposed portion of the glass fiber, wherein the step of stripping is a step of irradiating the coating layer with a laser light to strip the coating layer, wherein the step of stripping is a step of processing an end portion of the coating layer into a tapered shape whose diameter is reduced toward the exposed portion of the glass fiber, and wherein the step of stripping is a step of repeating: a step of arranging a mask that allows the laser light to pass through only a predetermined region between the optical fiber and a light source of the laser light and scanning the mask in a direction perpendicular to an axial direction of the optical fiber and in a direction perpendicular to an irradiation direction of the laser light; and a step of rotating the optical fiber about an axis of the optical fiber to change an irradiation position of the laser light to the optical fiber.

2. The method for manufacturing the optical fiber according to claim 1,
wherein a wavelength of the laser light is 170 nm or more and 250 nm or less.

3. The method for manufacturing the optical fiber according to claim 1,
wherein an energy density of the laser light is 1000 mJ/cm2 or less.

4. The method for manufacturing the optical fiber according to claim 1,
wherein the step of stripping is a step of rotating the optical fiber about an axis of the optical fiber and irradiating only the coating layer portion with the laser light while avoiding the glass fiber of the optical fiber.

5. The method for manufacturing the optical fiber according to claim 1,
wherein the coating layer of the optical fiber has a two-layer structure including a primary layer on a center side and a secondary layer on an outer periphery side, and the Young's modulus of the primary layer is 0.5 MPa or less.

6. The method for manufacturing the optical fiber according to claim 1, further comprising:
a step of exposing the glass fiber by extracting the coating layer of the optical fiber on one side from a portion where the coating layer is partially stripped, after the step of stripping.

7. A method for manufacturing an optical fiber, the method comprising:
a step of partially stripping a coating layer of the optical fiber;
a step of fusion-splicing an exposed end surface of a glass fiber; and
a step of recoating a protective resin covering a stripped portion of the coating layer and an exposed portion of the glass fiber, wherein the step of stripping is a step of irradiating the coating layer with a laser light to strip the coating layer, wherein the step of stripping is a step of processing an end portion of the coating layer into a tapered shape whose diameter is reduced toward the exposed portion of the glass fiber, and wherein the step of stripping is a step of rotating the optical fiber about an axis of the optical fiber and irradiating the optical fiber with the laser light in a state where a mask that allows the laser light to pass through only a predetermined region is arranged between the optical fiber and a light source of the laser light.

8. The method for manufacturing the optical fiber according to claim 7,
wherein the coating layer of the optical fiber has a two-layer structure including a primary layer on a center side and a secondary layer on an outer periphery side, and the Young's modulus of the primary layer is 0.5 MPa or less.

9. The method for manufacturing the optical fiber according to claim 7,
wherein a wavelength of the laser light is 170 nm or more and 250 nm or less.

10. The method for manufacturing the optical fiber according to claim 7,
wherein an energy density of the laser light is 1000 $mJ/cm^2$ or less.

11. The method for manufacturing the optical fiber according to claim 7,
wherein the step of stripping is a step of rotating the optical fiber about an axis of the optical fiber and irradiating only the coating layer portion with the laser light while avoiding the glass fiber of the optical fiber.

12. The method for manufacturing the optical fiber according to claim 7, further comprising:
a step of exposing the glass fiber by extracting the coating layer of the optical fiber on one side from a portion where the coating layer is partially stripped, after the step of stripping.

13. An optical fiber in which a coating layer at an end portion, on a splicing side, of each of a pair of optical fibers is processed into a tapered shape, exposed end surfaces of glass fibers are fusion-spliced, and a periphery of exposed portions of the glass fibers is protected with a protective resin,
wherein the tapered shape is a regular polygonal pyramid shape symmetrical with respect to an axis of the optical fiber.

* * * * *